United States Patent
Zhao et al.

(10) Patent No.: US 10,164,987 B2
(45) Date of Patent: Dec. 25, 2018

(54) CONTROLLING ACCESS TO DATA ORIGINATING FROM A THIRD PARTY WEBSITE

(71) Applicant: Microsoft Technology Licensing, LLC, Redmond, WA (US)

(72) Inventors: Sheng Zhao, Sunnyvale, CA (US); Lutz Thomas Finger, Mountain View, CA (US); Rezaur Rahman, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 15/056,936

(22) Filed: Feb. 29, 2016

(65) Prior Publication Data
US 2018/0063155 A1 Mar. 1, 2018

(51) Int. Cl.
*H04L 29/06* (2006.01)
*H04L 29/08* (2006.01)
*H04L 12/26* (2006.01)
*G06F 21/10* (2013.01)
*G06F 21/62* (2013.01)

(52) U.S. Cl.
CPC .......... *H04L 63/108* (2013.01); *G06F 21/10* (2013.01); *G06F 21/6245* (2013.01); *H04L 43/106* (2013.01); *H04L 67/02* (2013.01)

(58) Field of Classification Search
CPC ...... H04L 63/108; H04L 67/02; H04L 43/106
See application file for complete search history.

(56) References Cited

U.S. PATENT DOCUMENTS

| | | | |
|---|---|---|---|
| 9,264,463 B2 * | 2/2016 | Rubinstein | H04L 65/403 |
| 2003/0126215 A1 | 7/2003 | Udell | |
| 2008/0107271 A1 | 5/2008 | Mergen | |
| 2009/0119469 A1 | 5/2009 | Dellantoni et al. | |
| 2014/0282096 A1 | 9/2014 | Rubinstein et al. | |
| 2015/0128285 A1 * | 5/2015 | LaFever | H04L 67/02 726/26 |
| 2015/0378587 A1 * | 12/2015 | Falaki | H04L 67/02 715/747 |

FOREIGN PATENT DOCUMENTS

WO WO-2017151448 A1 9/2017

OTHER PUBLICATIONS

"International Application Serial No. PCT/US2017/019561, International Search Report dated May 8, 2017", 3 pgs.
"International Application Serial No. PCT/US2017/019561, Written Opinion dated May 8, 2017", 5 pgs.

* cited by examiner

Primary Examiner — Joseph P Hirl
Assistant Examiner — Thomas A Gyorfi
(74) Attorney, Agent, or Firm — Schwegman Lundberg & Woessner, P.A.

(57) ABSTRACT

Embodiments of a system and method for controlling access to personal information are generally described herein. In an example, a method may include receiving, at an internal server, data including personal information from a third party website, the personal information including a member identification to a social networking service, adding a time to live envelope to the data, receiving a request for the data, determining whether the time to live envelope indicates that the data is accessible, in response to determining that the time to live envelope indicates that the data is accessible, releasing the data according to the request, and aggregating the data with other information.

18 Claims, 6 Drawing Sheets

CONTROLLING ACCESS TO DATA ORIGINATING FROM A THIRD PARTY WEBSITE

BACKGROUND

Tracking activities of a member of a social networking system on third-party websites is used to customize member interactions with the social networking system. Privacy laws limit the use of third-party website data when it is personalized to a specific member. Existing systems for managing third-party website data often immediately delete member-specific information due to the privacy laws. Existing systems sometimes do not sufficiently protect members' personalized information.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A social networking system includes members that sign up with the social networking system and may log in to the system. Once registered, a member may invite other members, or be invited by other members, to connect via a content publishing service. A member connection, or simply connection, may require a bi-lateral agreement by the members, such that both members acknowledge the establishment of the connection. Members may connect with entities other than member profiles, such as companies, groups, or any other suitable cohort. The various associations and relationships that the members establish with other members, or with other entities may be represented by data stored in a database.

The content publishing service may provide a broad range of other applications and services that allow members the opportunity to share and receive information, often customized to the interests of the member. For example, with some embodiments, the content publishing service may include a photo sharing application that allows members to upload and share photos with other members. With some embodiments, members may be able to self-organize into groups, or interest groups, organized around a subject matter or topic of interest. With some embodiments, the content publishing service may host various job listings providing details of job openings with various organizations.

As members interact with the various applications, services and content made available via the content publishing service, the members' behavior (e.g., content (e.g., profiles) viewed, links selected, messages sent, etc.) may be monitored and information concerning the member's behavior may be stored. One type of behavior data that may be stored in database is member activity between a member having one member profile with another member having another member profile. As described above, examples of member activities include activities where one member: visits a profile page of a member, messages the member, saves the member in a contact list, introduces the member to another member profile.

Figure 1:
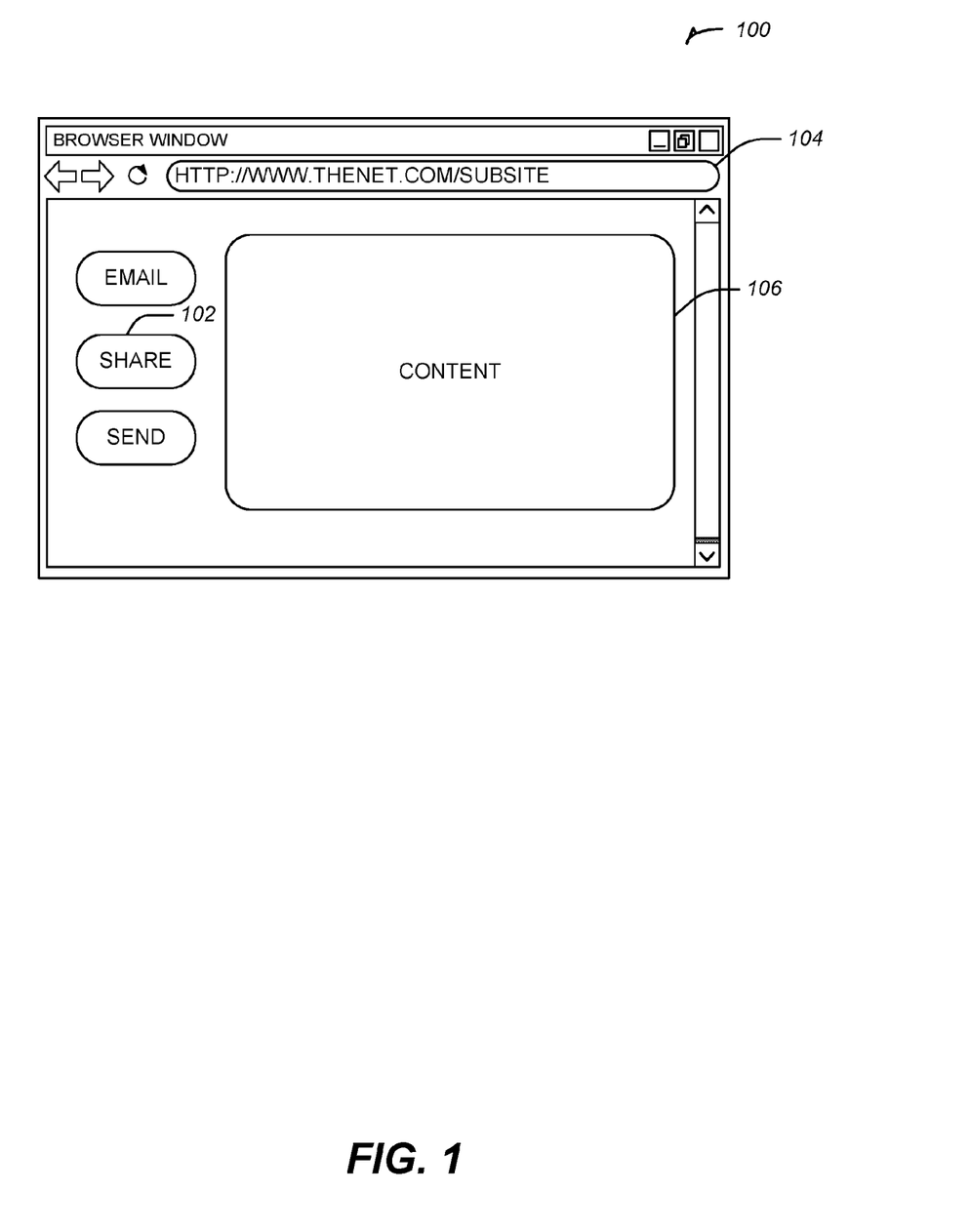
FIG. 1 illustrates a browser showing content and a social networking share button in accordance with some embodiments.

FIG. 1 illustrates a browser 100 showing content 106 and a social networking share button 102 in accordance with some embodiments. In an example, information about a member may be received by a social networking service from a third-party website, including a Uniform Resource Locator (URL) 104 of the third-party website. A user may navigate the browser 100 to the URL 104, such as by clicking a link or entering the URL 104 manually. The URL 104 includes content 106 and a share button 102. The share button 102 may be supplied by a server, such as a server supplying the content 106, a different third-party server, etc. The share button 102 may be a static part of the third-party website, may be added in response to detecting that a member is logged into a social networking site, or may be added according to member preferences.

The share button 102 may be used to open a menu to display different options for sharing the content 106 or the URL 104, such as on different social networking services, via email, or the like. In an example, the share button 102 may represent one of a plurality of share buttons to share the content 106 or the URL 104 on a plurality of social networking sites. The plurality of share buttons may be static or dynamic, such as by displaying social networking sites that the member is currently logged into, or may display the plurality of share buttons differently if the member is logged in (e.g., with personalized information).

In an example, when the share button 102 is pressed, the content 106 or the URL 104 may be shared on a social networking site. For example, the share button 102 may cause information from the third-party website to be displayed on a member's social networking feed. In another example, the share button 102 may cause a social networking site to open, such as in a new browser tab or in a pop up browser within the browser 100. When the social networking site opens, the member may edit the information to be shared on the member's social networking feed, which may include the content 106 or the URL 104.

In an example, when the share button 102 is pressed, information may be sent to a social networking server corresponding to the social networking site of the share button 102. In another example, when a member completes an action of sharing content on the social networking site after pressing the share button 102, the information may be sent to the social networking server. The information may include member information, information about the website, the content 106, the URL 104, or the like.

Figure 2:
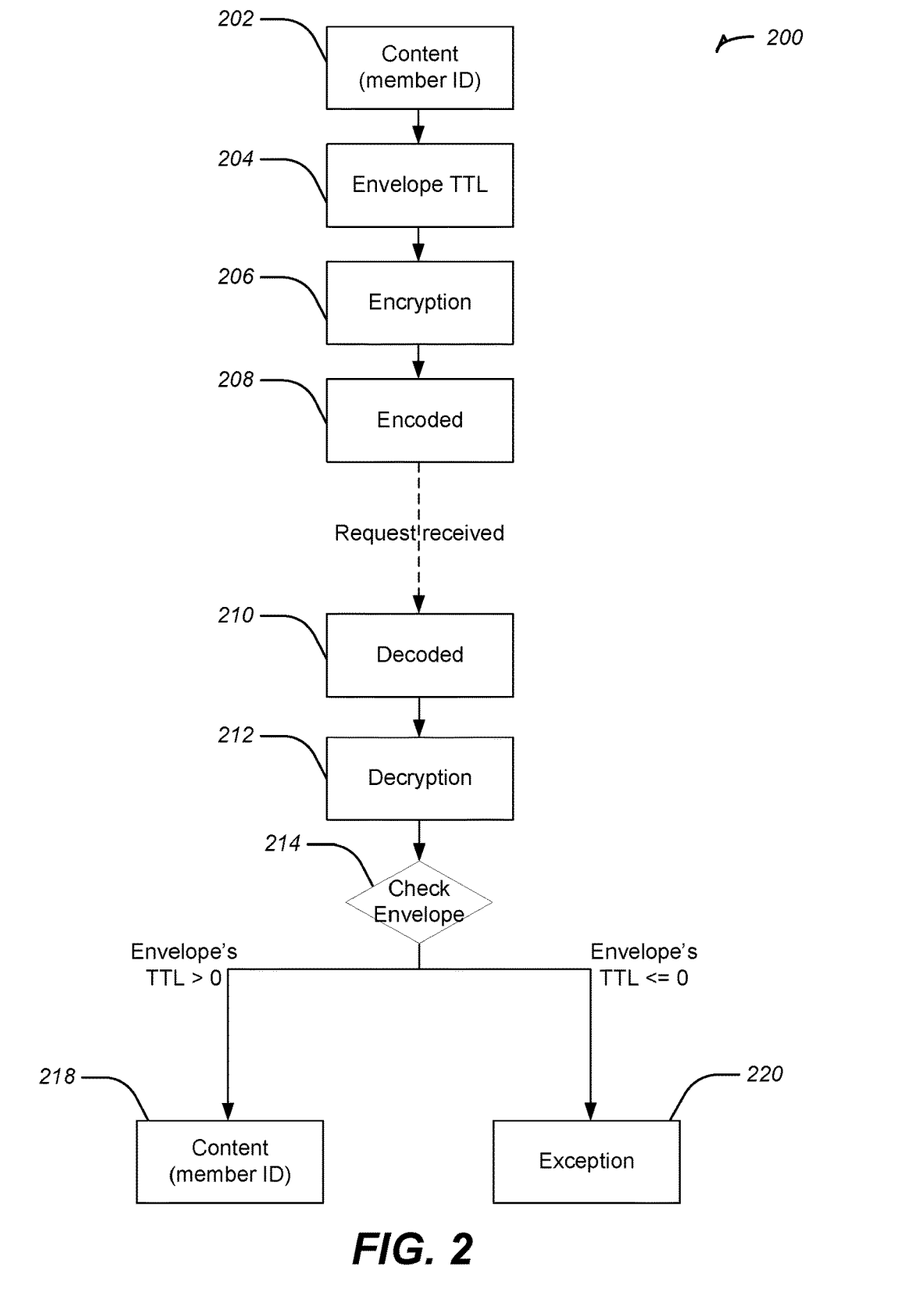
FIG. 2 illustrates a flowchart of a technique for encrypting and enveloping data in accordance with some embodiments.

FIG. 2 illustrates a flowchart of a technique 200 for encrypting and enveloping data in accordance with some embodiments. The technique 200 includes an operation 202 to determine content, including a member identification of a member of a social networking site. The operation 202 may include retaining additional information, such as the member's company, job, industry, or the like. The content may include a URL, website content, a timestamp, or the like.

The technique 200 includes an operation 204 to envelope the content, using a time to live (TTL) envelope. The TTL envelope may ensure that the content is not accessible after the TTL expires. The TTL envelope may include a countdown timer or may include a specified date or time to expire. The technique 200 includes an operation 206 to encrypt the content. The encryption may include PGP encryption. In an example, PGP encryption includes using random generated keys. A random generated key is protected by a public key in PGP encryption. The random generated key is passed over together with the content when a request is received.

The technique 200 includes an operation 210 to use a private key to decode the random key. The technique 200 includes an operation 212 to decrypt the content using the random key. In an example, the key may change each time the content is accessed. At operation 214, the technique 200 includes determining whether the TTL envelope indicates the content is accessible or inaccessible. In an example, the content is accessible when the TTL envelope is greater than zero or before the TTL end date. In an example, the content is inaccessible when the TTL envelope is zero or less or after the TTL end date. Advanced encryption may be used for the TTL envelope. Instead of encrypting the data file only, a timestamp (i.e., TTL) may be introduced into the encryption content. When the TTL envelope is not expired, the technique 200 may include delivering the content to a requesting entity at operation 218. In an example, a TTL message may be sent at operation 218 indicating that the content will expire within 5 days. When the TTL envelope is expired, the technique 200 may include not delivering the content at operation 220, and may instead deliver an exception.

In an example, the decryption key may be available to users of a social networking company. The technique may include a review process to track and monitor any data that is decrypted. After the content is decrypted, the technique may include determining whether the TTL envelope is expired when the content is accessed. For example, when the content is downloaded from an internal content server and decrypted, it may be saved for later use. When it is later accessed, the content may be checked for a TTL envelope, and if the TTL envelope is expired, the content may not open. The content, once the TTL envelope is added may be kept internal, and not be sent to a third party.

Figure 3:
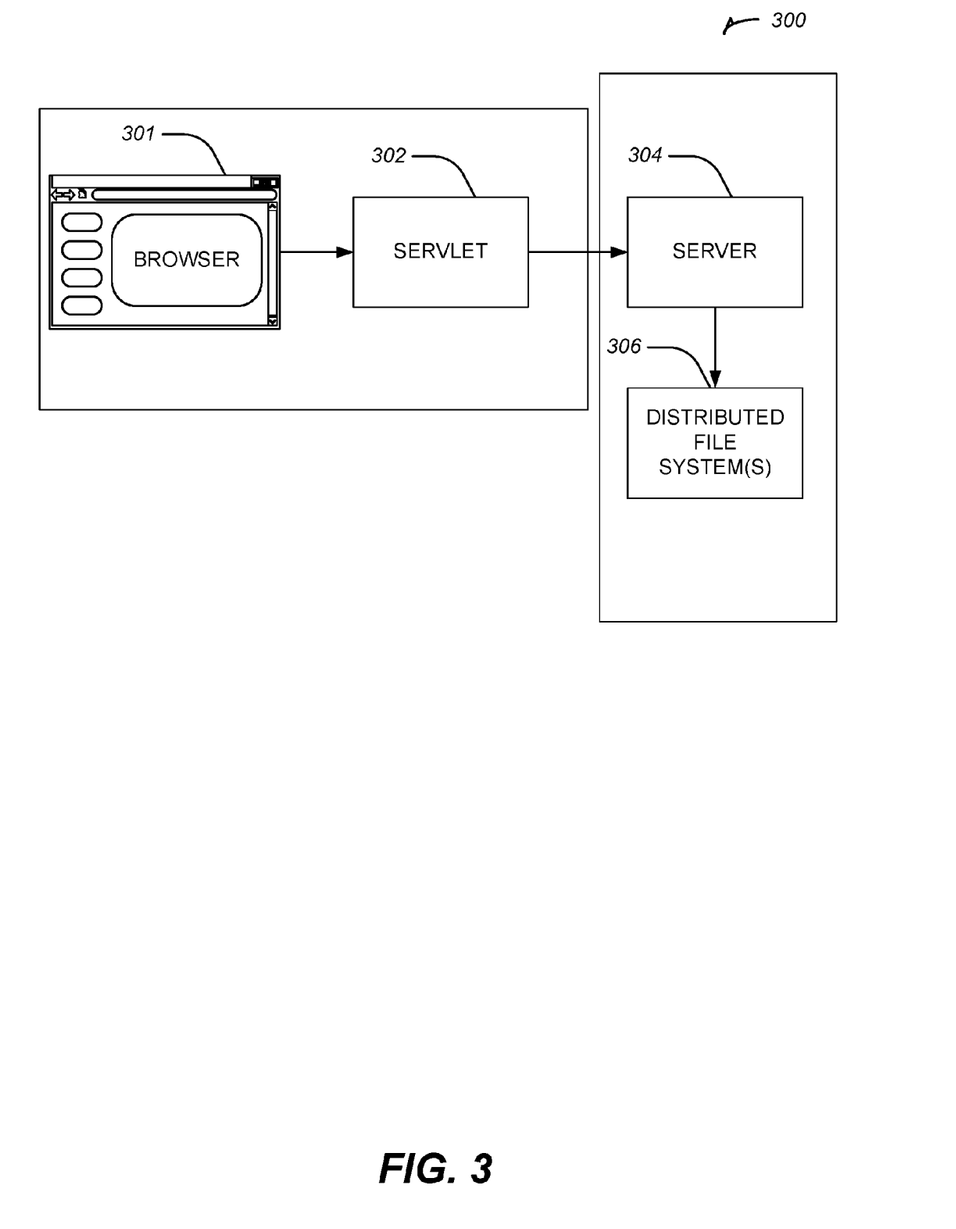
FIG. 3 illustrates a block diagram of a system for managing data from a website in accordance with some embodiments.

FIG. 3 illustrates a block diagram of a system 300 for managing data from a website in accordance with some embodiments. The system 300 may be used to monitor member level data and delete the data within 7 days. Aggregated data may be retained and used after the 7 day expiration. In an example, the raw data may be accessed with a decryption key and a review process may be in place to monitor data usage and ensure the personal data is completely and permanently deleted.

The system 300 includes a browser 301, such as browser 100 of FIG. 1. When information is passed to a social networking site, the information may be sent to a servlet 302 used in the browser 301, and the servlet 302 may send the information to a server 304. The server 304 may include a server for the social networking site. The server 304 may send the information to a distributed file system 306. In an example, the servlet 302 may strip some personal information, such as an internet protocol (IP) address, or the like. The server 304 may store the information received from the servlet 302, such as until the information is requested by the distributed file system 306.

Figure 4:
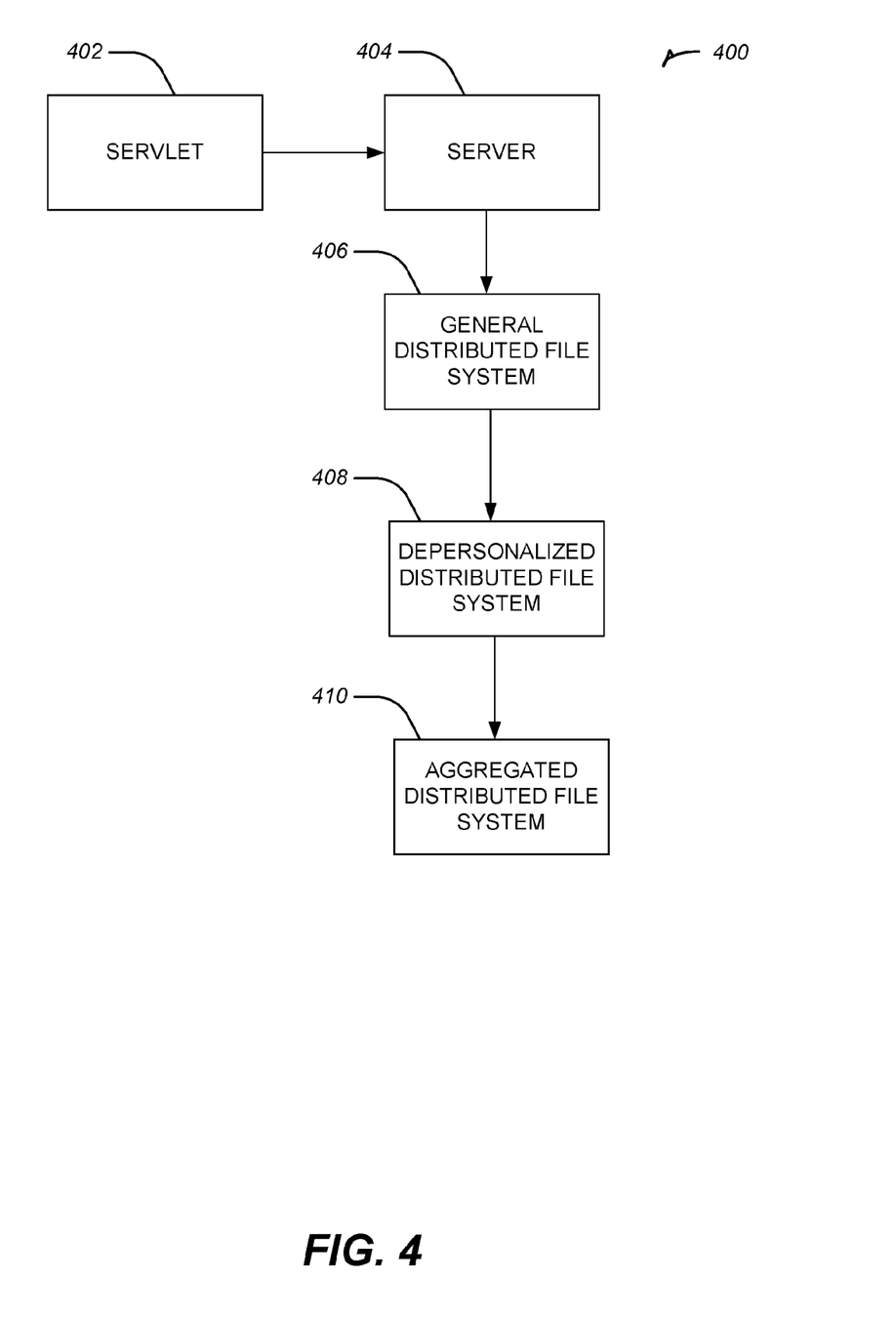
FIG. 4 illustrates a block diagram of a system for file management in accordance with some embodiments.

FIG. 4 illustrates a block diagram of a system 400 for file management in accordance with some embodiments. The system 400 includes a servlet 402 and a server 400. The system 400 may include a general distributed file system 406, a depersonalized distributed file system 408, and an aggregated distributed file system 410. The three file systems 406-410 may be used to segregate data that includes personalized information that may include a TTL envelope.

The system 400 may use PGP encryption including public/private key encryption. Public keys may be made public, and in an example, private keys may be kept private within a social networking company. PGP encryption may be used in system 400 to create a new object, a TTP envelope, to secure data. The TTL envelope may be based on a user submitted TTL. The TTL envelope may be implemented using java. The system 400 may use a secure data storage file system, such as a secured HDFS. HDFS may be used to configure one or more of the distributed file systems 406-410.

The system 400 may be used to track an event from outside a social networking site. The servlet 402 may accept the tracked event and encrypt using PGP encryption. The servlet 402 may transmit the event to the social networking site's internal server 404. The internal content server 404 or the distributed file systems 406-410 may include a Kafka Apache server. The internal content server 404 may persist the encrypted raw data into a secured HDFS location, such as the general distributed file system 406. The raw day may have a 7 day retention maximum that may be respected on HDFS. In an example, an existing purge process may be used or a specific purge job may be used for this data, such as twice a week. After this purge process, remaining personalized information for the member has been wiped from the social networking servers. The purge process may include stripping the personalized information from the raw data at the general distributed file system 406, and sending the stripped data to the depersonalized distributed file system 408. The raw data with the personalized information may then be deleted from the general distributed file system 406. The stripped data at the depersonalized distributed file system 408 may be combined with other stripped data at the aggregated distributed file system 410 to form aggregated data. The aggregated data may be retained longer than the 7 day maximum as the aggregated data does not include personalized information. In an example, the stripped data may be retained or deleted at the depersonalized distributed file system 408.

In an example, before the data is stripped for personalized information, a list of qualified users (e.g., qualified users of the social networking site) may be created that may access the data. The data may still only be accessed within the 7 day window, subject to the TTL envelope.

An extract, transform, and load (ETL) process may be used to decrypt and generate the stripped data, so that the data may not be used to identify a member. The outputted stripped data may be persisted in HDFS, such as at the depersonalized distributed file system 408 or the aggregated distributed file system 410 for longer retention. The stripped or aggregated data may be open to a larger audience (e.g., additional users of the social networking site other than the qualified users described above). The ETL process may be used to aggregate the data in multiple granularities.

In an example, aggregated insights may be made from the depersonalized data. For example, people entities, such as which writers or content "amplifiers" a member is interested in. That information may be used to determine member recommendations for the member to follow or connect with, such as members the member may want to get to know. The aggregated insights may be used to determine a member's interests and focus information to be delivered to the member. In another example, the aggregated insights may be used to recommend jobs, companies, news feeds, articles, books, or the like. In yet another example, the aggregated in sights may be used to determine relevant places or locations for a member to determine if members' interests change based on region. In still another example, the aggregated insights may be used to map content preferences of members onto skills and reputation scores.

Figure 5:
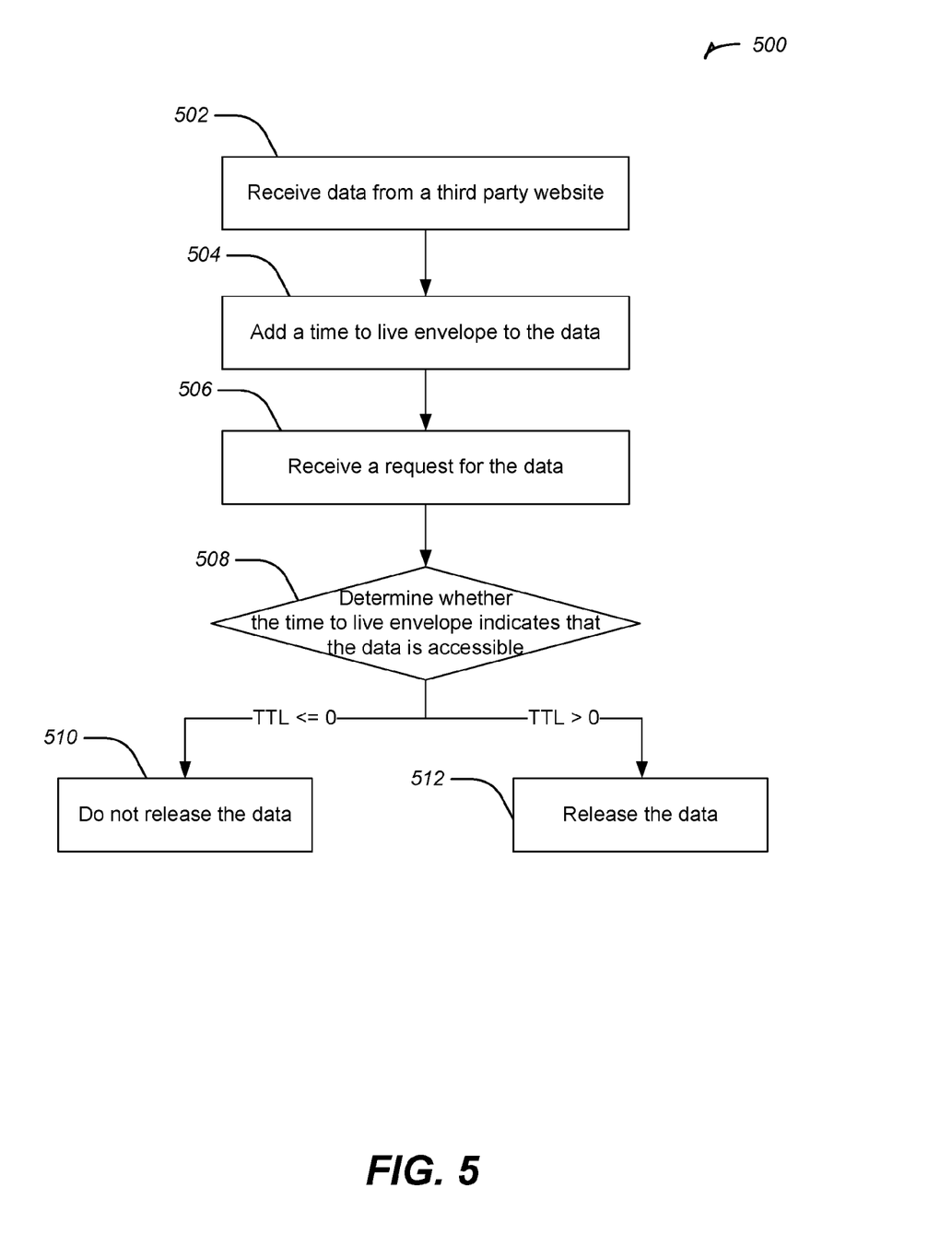
FIG. 5 illustrates a flowchart of a technique for controlling access to personal information in accordance with some embodiments.

FIG. 5 illustrates a flowchart of a technique 500 for controlling access to personal information in accordance with some embodiments. The technique 500 includes an operation 502 to receive data from a third party website. Receiving the data may include receiving the data at an internal server (e.g., the internal server is internal to a company and the third party website is external to the company). The data may include personal information, such as a member identification to a social networking service, such as a social networking service of the company. In an example, the data may include a URL of the third party website.

The technique 500 includes an operation 502 to add a TTL envelope to the data. In an example, the TTL envelope may include a countdown timer. For example, the countdown timer may include a timestamp, and determining whether the time to live envelope indicates that the data is accessible may include comparing a current time to the timestamp, such as a drop dead date. In another example, the countdown timer may include determining whether the time to live envelope indicates that the data is accessible by determining whether the countdown timer is greater than zero. The technique 500 may include encrypting the data after or before adding the time to live envelope.

The technique 500 includes an operation 502 to receive a request for the data. The technique 500 includes an operation 502 to determine whether the TTL envelope indicates the data is accessible. The technique 500 includes an operation 502 to, when the TTL envelope indicates the data is expired, withhold the data. Operation 502 may include permanently preventing the data from being accessed in response to determining that the time to live envelope indicates that the data is not accessible. The technique 500 includes an operation 502 to, when the TTL envelope indicates the data is accessible, release the data.

The technique 500 may include an operation to aggregate the data with other information. The other information may include other data with a TTL envelope. In an example, aggregating the data removes the personal information from the data. The personal information may include a company, a job, a location, or the like, of the member identified by the member identification. In an example, the TTL envelope may indicate that the data is accessible for no more than seven days. For example, after expiration of the seven days, the TTL envelope may permanently prevent the data from being accessed or may destroy the data.

Figure 6:
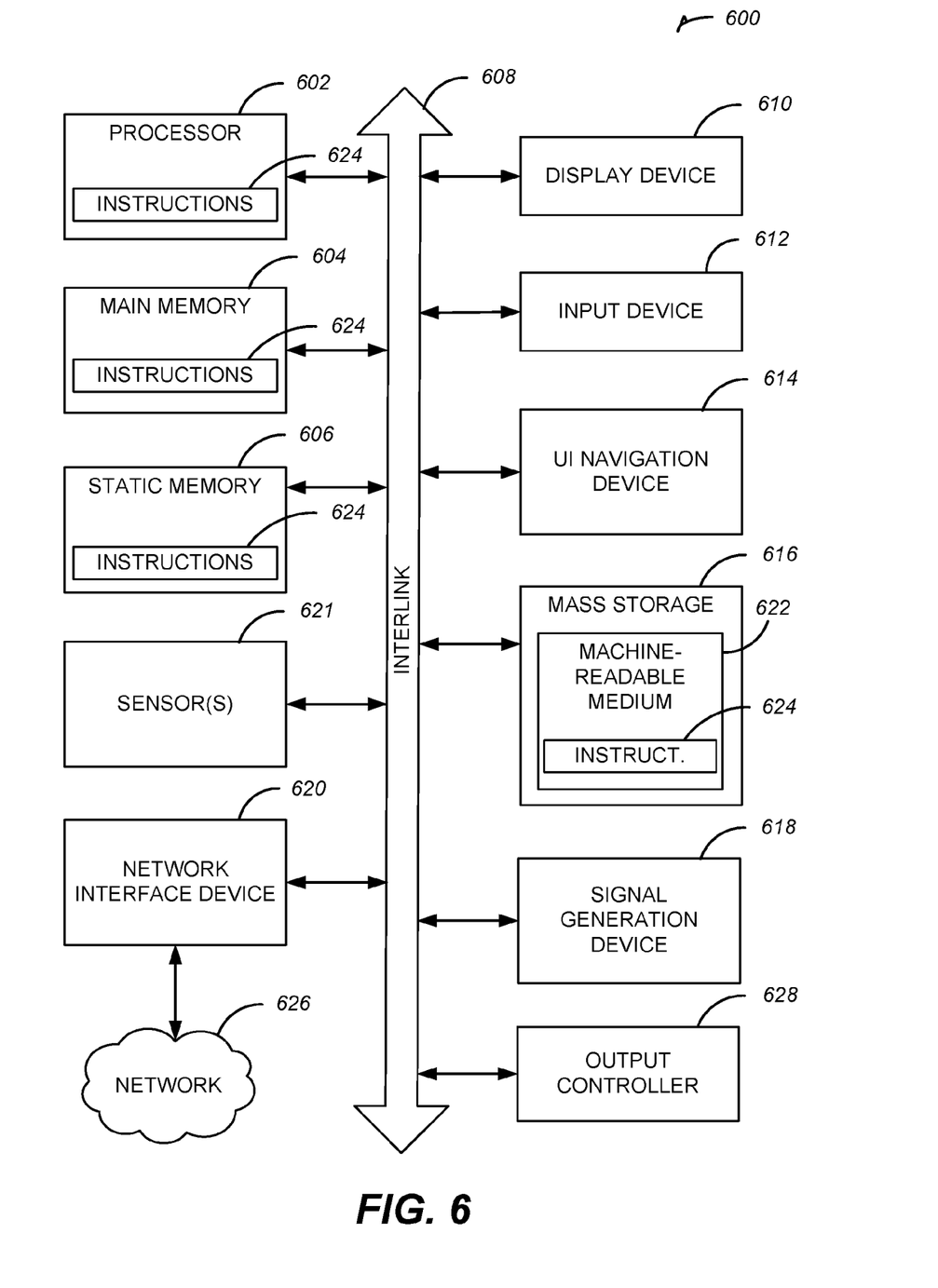
FIG. 6 illustrates generally an example of a block diagram of a machine upon which any one or more of the techniques (e.g., methodologies) discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 is a method for controlling access to personal information, the method comprising: receiving, at an internal server, data including personal information from a third party website, the personal information including a member identification to a social networking service; adding a time to live envelope to the data; receiving a request for the data; determining whether the time to live envelope indicates that the data is accessible; in response to determining that the time to live envelope indicates that the data is accessible, releasing the data according to the request; and aggregating the data with other information.

In Example 2, the subject matter of Example 1 optionally includes, wherein aggregating the data removes the personal information from the data.

In Example 3, the subject matter of any one or more of Examples 1-2 optionally include, further comprising encrypting the data after adding the time to live envelope.

In Example 4, the subject matter of any one or more of Examples 1-3 optionally include, wherein the time to live envelope includes a timestamp, and wherein determining whether the time to live envelope indicates that the data is accessible includes comparing a current time to the timestamp.]

In Example 5, the subject matter of any one or more of Examples 1-4 optionally include, wherein the time to live envelope includes a countdown timer, and wherein determining whether the time to live envelope indicates that the data is accessible includes determining whether the countdown timer is greater than zero.

In Example 6, the subject matter of any one or more of Examples 1-5 optionally include, wherein the personal information includes a company of a member identified by the member identification.

In Example 7, the subject matter of any one or more of Examples 1-6 optionally include, wherein the data includes a universal resource locator (URL) of the third party website.

In Example 8, the subject matter of any one or more of Examples 1-7 optionally include, wherein the time to live envelope indicates that the data is accessible for no more than seven days.

In Example 9, the subject matter of Example 8 optionally includes, wherein after expiration of the seven days, the time to live envelope permanently prevents the data from being accessed.

In Example 10, the subject matter of any one or more of Examples 1-9 optionally include, further comprising permanently preventing the data from being accessed in response to determining that the time to live envelope indicates that the data is not accessible.

Example 11 is a machine readable medium including instructions for receiving information, which when executed by a machine, cause the machine to perform operations comprising: receiving, at an internal server, data including personal information from a third party website, the personal information including a member identification to a social networking service; adding a time to live envelope to the data; receiving a request for the data; determining whether the time to live envelope indicates that the data is accessible; in response to determining that the time to live envelope indicates that the data is accessible, releasing the data according to the request; and aggregating the data with other information.

In Example 12, the subject matter of Example 11 optionally includes, wherein aggregating the data removes the personal information from the data.

In Example 13, the subject matter of any one or more of Examples 11-12 optionally include, further comprising encrypting the data after adding the time to live envelope.

In Example 14, the subject matter of any one or more of Examples 11-13 optionally include, wherein the time to live envelope includes a timestamp, and wherein determining whether the time to live envelope indicates that the data is accessible includes comparing a current time to the timestamp.

In Example 15, the subject matter of any one or more of Examples 11-14 optionally include, wherein the time to live envelope includes a countdown timer, and wherein determining whether the time to live envelope indicates that the data is accessible includes determining whether the countdown timer is greater than zero.

In Example 16, the subject matter of any one or more of Examples 11-15 optionally include, wherein the personal information includes a company of a member identified by the member identification.

In Example 17, the subject matter of any one or more of Examples 11-16 optionally include, wherein the data includes a universal resource locator (URL) of the third party website.

In Example 18, the subject matter of any one or more of Examples 11-17 optionally include, wherein the time to live envelope indicates that the data is accessible for no more than seven days.

In Example 19, the subject matter of Example 18 optionally includes, wherein after expiration of the seven days, the time to live envelope permanently prevents the data from being accessed.

In Example 20, the subject matter of any one or more of Examples 11-19 optionally include, further comprising permanently preventing the data from being accessed in response to determining that the time to live envelope indicates that the data is not accessible.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for controlling access to personal information, the method comprising:
   receiving, at an internal server and from a third party website, data including personal information of a user of a social networking service, the personal information including a member identification to the social networking service;
   adding a time to live envelope to the data;
   receiving a request for the data;
   determining whether the time to live envelope indicates that the data is accessible;
   in response to determining that the time to live envelope indicates that the data is accessible, releasing the data according to the request;
   aggregating the data with other information, wherein aggregating the data includes removing the personal information from the aggregated data; and
   in response to determining that the time to live envelope indicates that the data is inaccessible, allowing access to the aggregated data with the personal information removed.

2. The method of claim 1, further comprising encrypting the data after adding the time to live envelope.

3. The method of claim 1, wherein the time to live envelope includes a timestamp, and wherein determining whether the time to live envelope indicates that the data is accessible includes comparing a current time to the timestamp.

4. The method of claim 1, wherein the time to live envelope includes a countdown timer, and wherein determining whether the time to live envelope indicates that the data is accessible includes determining whether the countdown timer is greater than zero.

5. The method of claim 1, wherein the personal information includes a company of a member identified by the member identification.

6. The method of claim 1, wherein the data includes a universal resource locator of the third party website.

7. The method of claim 1, wherein the time to live envelope indicates that the data is accessible for no more than seven days.

8. The method of claim 7, wherein after expiration of the seven days, the time to live envelope permanently prevents the data from being accessed.

9. The method of claim 1, further comprising permanently preventing the data from being accessed in response to determining that the time to live envelope indicates that the data is not accessible.

10. A non-transitory machine readable medium including instructions for receiving information, which when executed by a machine, cause the machine to perform operations comprising:
    receiving, at an internal server, data including personal information from a third party website, the personal information including a member identification to a social networking service;
    adding a time to live envelope to the data;
    receiving a request for the data;
    determining whether the time to live envelope indicates that the data is accessible;
    in response to determining that the time to live envelope indicates that the data is accessible, releasing the data according to the request;
    aggregating the data with other information, wherein aggregating the data includes removing the personal information from the aggregated data; and
    in response to determining that the time to live envelope indicates that the data is inaccessible, allowing access to the aggregated data with the personal information removed.

11. The machine readable medium of claim 10, further comprising encrypting the data after adding the time to live envelope.

12. The machine readable medium of claim 10, wherein the time to live envelope includes a timestamp, and wherein determining whether the time to live envelope indicates that the data is accessible includes comparing a current time to the timestamp.

13. The machine readable medium of claim 10, wherein the time to live envelope includes a countdown timer, and wherein determining whether the time to live envelope indicates that the data is accessible includes determining whether the countdown timer is greater than zero.

14. The machine readable medium of claim 10, wherein the personal information includes a company of a member identified by the member identification.

15. The machine readable medium of claim 10, wherein the data includes a universal resource locator (URL) of the third party website.

16. The machine readable medium of claim 10, wherein the time to live envelope indicates that the data is accessible for no more than seven days.

17. The machine readable medium of claim 16, wherein after expiration of the seven days, the time to live envelope permanently prevents the data from being accessed.

18. The machine readable medium of claim 10, further comprising permanently preventing the data from being accessed in response to determining that the time to live envelope indicates that the data is not accessible.

* * * * *

UNITED STATES PATENT AND TRADEMARK OFFICE
CERTIFICATE OF CORRECTION

PATENT NO. : 10,164,987 B2
APPLICATION NO. : 15/056936
DATED : December 25, 2018
INVENTOR(S) : Zhao et al.

Page 1 of 1

It is certified that error appears in the above-identified patent and that said Letters Patent is hereby corrected as shown below:

In the Claims

In Column 10, Line 16, in Claim 6, after "locator", insert --(URL)--

Signed and Sealed this
Twenty-first Day of April, 2020

Andrei Iancu
*Director of the United States Patent and Trademark Office*